(12) United States Patent
Chiang

(10) Patent No.: US 9,148,050 B2
(45) Date of Patent: Sep. 29, 2015

(54) AC/DC CONVERTING CIRCUIT

(71) Applicant: Power Forest Technology Corporation, Hsinchu (TW)

(72) Inventor: Yun-Chi Chiang, Hsinchu County (TW)

(73) Assignee: Power Forest Technology Corporation, Hsinchu County (TW)

( * ) Notice: Subject to any disclaimer, the term of this patent is extended or adjusted under 35 U.S.C. 154(b) by 128 days.

(21) Appl. No.: 13/941,540

(22) Filed: Jul. 14, 2013

(65) Prior Publication Data

US 2014/0268935 A1    Sep. 18, 2014

(30) Foreign Application Priority Data

Mar. 18, 2013  (TW) .............................. 102109526 A

(51) Int. Cl.
H02M 1/00 (2007.01)
H02M 1/36 (2007.01)
H02M 7/217 (2006.01)

(52) U.S. Cl.
CPC ................ *H02M 1/36* (2013.01); *H02M 7/217* (2013.01)

(58) Field of Classification Search
CPC ....................................................... H02M 1/36
USPC ...................................... 363/49, 78; 323/234
See application file for complete search history.

(56) References Cited

U.S. PATENT DOCUMENTS

2014/0126254 A1* 5/2014 Al-Shyoukh et al. ........... 363/49
2014/0268951 A1* 9/2014 Wang et al. ..................... 363/78

\* cited by examiner

*Primary Examiner* — Timothy J Dole
*Assistant Examiner* — Htet Kyaw
(74) *Attorney, Agent, or Firm* — Jianq Chyun IP Office

(57) ABSTRACT

An AC/DC converting circuit and a starting method thereof are provided. An AC detection or a rectified AC voltage detection is disabled when the AC voltage or the rectified AC voltage not up to a start-up voltage is detected, so as to shorten a recovery time of a voltage of a power supply terminal of an AC/DC power conversion controller, and further shorten a starting time of the AC/DC converting circuit.

5 Claims, 3 Drawing Sheets

AC/DC CONVERTING CIRCUIT

CROSS-REFERENCE TO RELATED APPLICATION

This application claims the priority benefit of Taiwan application serial no. 102109526, filed on Mar. 18, 2013. The entirety of the above-mentioned patent application is hereby incorporated by reference herein and made a part of this specification.

BACKGROUND OF THE INVENTION

1. Field of the Invention

The invention relates to an AC/DC converting circuit and a starting method thereof. More particularly, the invention relates to an AC/DC converting circuit that shortens a starting time of the AC/DC converting circuit and a starting method thereof.

2. Description of Related Art

In the conventional techniques, before an AC/DC converting circuit is started, an AC/DC power conversion controller in the AC/DC converting circuit is continuously detecting a voltage value of an inputted AC voltage. As shown in a schematic view illustrating a waveform of an AC voltage and a power source voltage of an AC/DC power conversion controller of FIG. 1, since a power source current needed for the AC/DC power conversion controller to perform an AC voltage detection is greater than a current supplied by an AC voltage source, the power source voltage of the AC/DC power conversion controller dropped down due to an insufficient voltage supply.

When the power source voltage of the AC/DC power conversion controller drops down to a triggered voltage level V1 of a voltage lockout, a voltage detection function of the AC/DC power conversion controller is disabled. At this time, a current needed by the AC/DC power conversion controller is smaller than that supplied by the AC voltage source. Thus, the power source voltage of the AC/DC power conversion controller gradually rises, and then the AC/DC power conversion controller begins to detect the AC voltage after the power source voltage of the AC/DC power conversion controller gradually rises up to a released voltage level V2 of the voltage lockout. Thus, the AC voltage is repeatedly detected until the AC voltage rises up to a start-up voltage, which causes a saw tooth wave change of the power source voltage of the AC/DC power conversion controller as shown in FIG. 1.

In a conventional way of starting an AC/DC converting circuit, a power source voltage of an AC/DC power conversion controller has to oscillate greatly back and forth between the triggered voltage level V1 and the released voltage level V2 of the voltage lockout. Even if the AC voltage rises up to the start-up voltage, a waiting time is still needed for the power source voltage of the AC/DC power conversion controller to rise up to the released voltage level V2 of the voltage lockout in order to start the AC/DC converting circuit. However, a starting speed of the AC/DC converting circuit is thus slowed down.

SUMMARY OF THE INVENTION

The invention provides an AC/DC converting circuit and a method for starting the same, which can shorten a starting time for the AC/DC converting circuit.

The AC/DC converting circuit of the invention includes an AC/DC converting unit and an AC/DC power conversion controller, wherein the AC/DC converting unit converts an AC voltage into a DC voltage. The AC/DC power conversion controller is coupled to the AC/DC converting unit, detects the AC voltage or a rectified AC voltage, and then disables an AC voltage detection or a rectified AC voltage detection after a power source voltage of the AC/DC power conversion controller rises up to a released voltage level of a voltage lockout and when the AC voltage or the rectified AC voltage is detected for not rising up to a start-up voltage, such that the power source voltage of the AC/DC power conversion controller continues change slightly between the released voltage level and a voltage level smaller than the released voltage level.

In one embodiment of the invention, the AC/DC power conversion controller enables the AC/DC converting unit to convert the AC voltage into the DC voltage after the power source voltage of the AC/DC power conversion controller rises up to a released voltage level of the voltage lockout and when the AC/DC power conversion controller detects that the AC voltage or the rectified AC voltage rises up to the start-up voltage and the AC voltage or the rectified AC voltage is continuously greater than the start-up voltage for a predetermined period of time.

In one embodiment of the invention, an output terminal of the AC/DC converting unit is further coupled to a power source terminal of the AC/DC power conversion controller. The AC/DC converting circuit further includes a first rectifying unit coupled between an AC voltage and the power source terminal of the AC/DC power conversion controller, and rectifies the AC voltage to generate the rectified AC voltage and to provide a DC power source to the power source terminal of the AC/DC power conversion controller.

In one embodiment of the invention, the AC/DC power conversion controller includes a voltage detecting unit and a control unit, wherein the voltage detecting unit detects the AC voltage or the rectified AC voltage. The control unit is coupled to the voltage detecting unit and the AC/DC converting unit, and determines whether the AC voltage or the rectified AC voltage detected by the voltage detecting unit is greater than or equivalent to the start-up voltage, and shuts down the voltage detecting unit when the AC voltage or the rectified AC voltage is smaller than the start-up voltage, and enables the AC/DC converting unit to convert the AC voltage or the rectified AC voltage into the DC voltage when the AC voltage or the rectified AC voltage is continuously greater than or equivalent to the start-up voltage for a predetermined period of time.

In one embodiment of the invention, the AC/DC converting circuit further includes a capacitor coupled between the power source terminal of the AC/DC power conversion controller and a ground.

In one embodiment of the invention, the first rectifying unit includes a rectifying diode and a resistor, wherein the rectifying diode rectifies the AC voltage to generate the rectified AC voltage, and the resistor and the rectifying diode are connected in series between the AC voltage and the power source terminal of the AC/DC power conversion controller.

In one embodiment of the invention, the AC/DC converting circuit further includes a voltage dividing unit coupled between the AC voltage and the ground or coupled between the rectified AC voltage and the ground, and dividing the AC voltage or the rectified AC voltage in order to provide a voltage dividing signal to the AC/DC power conversion controller.

In one embodiment of the invention, the voltage dividing unit includes a first voltage dividing resistor and a second voltage dividing resistor, wherein the first voltage dividing resistor and the second voltage dividing resistor are coupled in series between the AC voltage and the ground or between the rectified AC voltage and the ground, and a common contact of the first voltage dividing resistor and the second voltage dividing resistor is coupled to the AC/DC power conversion controller.

The invention provides a method for starting an AC/DC converting circuit, comprising the following steps: detecting an AC voltage or a rectified AC voltage; determining whether the AC voltage or the rectified AC voltage is greater than or equivalent to a start-up voltage; disabling the AC voltage detection or the rectified AC voltage detection if the AC voltage or the rectified AC voltage is smaller than the start-up voltage; starting the AC/DC converting circuit to perform AC/DC conversions so as to convert the AC voltage into a DC voltage if the AC voltage or the rectified AC voltage is continuously greater than or equivalent to the start-up voltage for a predetermined period of time.

In light of the above, in the invention, an AC voltage detection or a rectified AC voltage detection is disabled when detecting that the AC voltage or the rectified AC voltage does not rise up to a start-up voltage, and a waiting time is no longer needed in terms of disabling the AC voltage detection or the rectified AC voltage detection only after triggering a locked mechanism of waiting for a low voltage. Thus, a recovery time of a power source terminal voltage of the AC/DC power conversion controller is shortened to speed up a starting speed for the AC/DC converting circuit.

To make the above features and advantages of the invention more comprehensible, several embodiments accompanied with drawings are described in details as follows.

DESCRIPTION OF EMBODIMENTS

Figure 1:
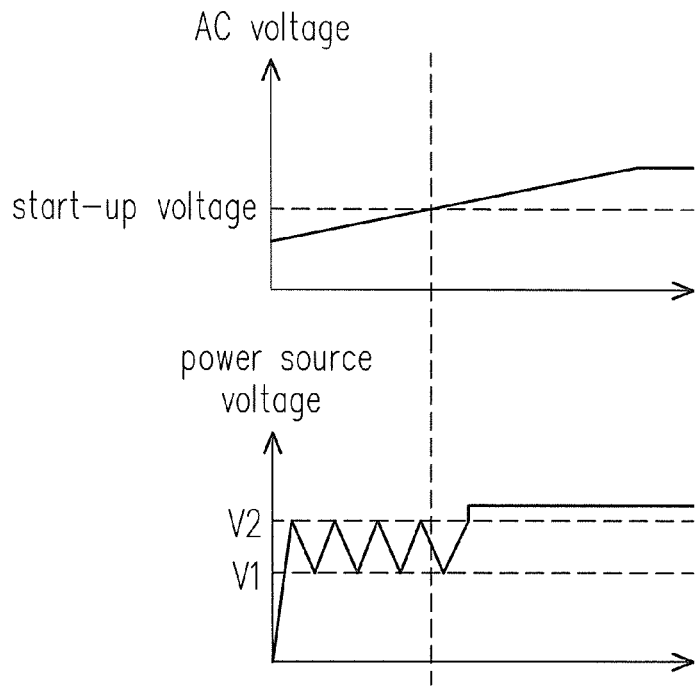
FIG. 1 is a schematic view illustrating a waveform of an AC voltage and a power source voltage of an AC/DC power conversion controller.
Figure 2:
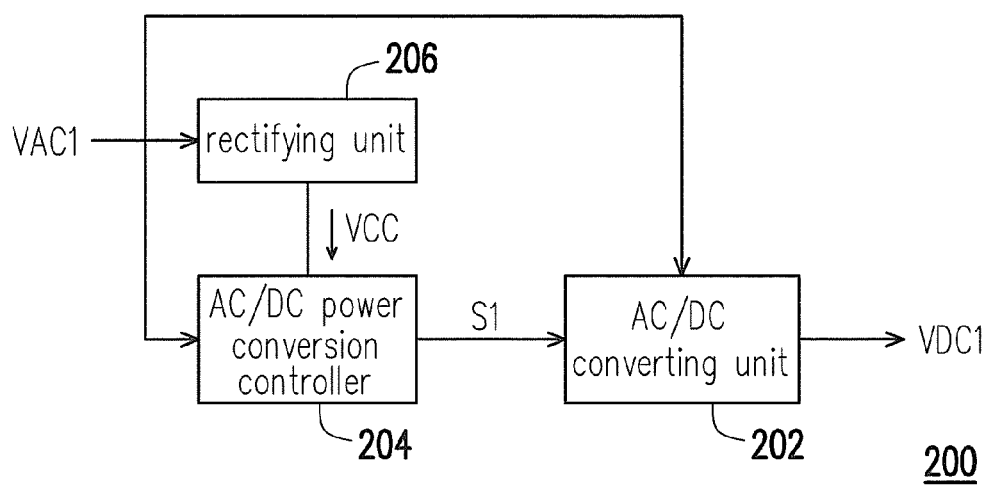
FIG. 2 is a schematic view illustrating an AC/DC converting circuit according to one embodiment of the invention.

FIG. 2 is a schematic view illustrating an AC/DC converting circuit according to one embodiment of the invention. Please refer to FIG. 2. An AC/DC converting circuit 200 includes an AC/DC converting unit 202, an AC/DC power conversion controller 204 and a rectifying unit 206, wherein the AC/DC converting unit 202 is coupled to the AC/DC power conversion controller 204, and the AC/DC power conversion controller 204 is further coupled to the rectifying unit 206. The AC/DC converting unit 202 is configured to convert an AC voltage VAC1 into a DC voltage VDC1. The rectifying unit 206 rectifies the AC voltage VAC1 and outputs accordingly a power source voltage VCC to the AC/DC power conversion controller 204. The AC/DC power conversion controller 204 is configured to detect the AC voltage VAC1.

Herein, when the AC/DC power conversion controller 204 detects that the AC voltage VAC1 does not rise up to a start-up voltage of the AC/DC converting circuit 200 after the power source voltage VCC rises up to a released voltage level of a voltage lockout, the AC/DC power conversion controller 204 disables detecting the AC voltage VAC1 for the power source voltage VCC to rise immediately, rather than disabling detecting the AC voltage VAC1 after the power source voltage VCC drops down to a triggering level of a under voltage lockout, which is known as a conventional techniques. In other words, a power source voltage of an AC/DC power conversion controller is always changing slightly between the released voltage level and a voltage level slightly smaller than the released voltage level. Thus, the power source voltage VCC can quickly rise up to a voltage value that is sufficient to provide the AC/DC power conversion controller 204 to detect the AC voltage VAC1, so as to perform the next AC voltage VAC1 detection.

When the AC/DC power conversion controller 204 detects that the AC voltage VAC1 rises up to the start-up voltage of the AC/DC converting circuit 200 after the power source voltage VCC rises up to the released voltage level of the voltage lockout, the AC/DC power conversion controller 204 begins to switch a voltage level of an enabling signal S1 outputted to the AC/DC converting unit 202 after the AC voltage VAC1 is continuously greater than the start-up voltage for a predetermined time, so as to enable the AC/DC converting unit 202 to begin AC/DC conversions.

Figure 3:
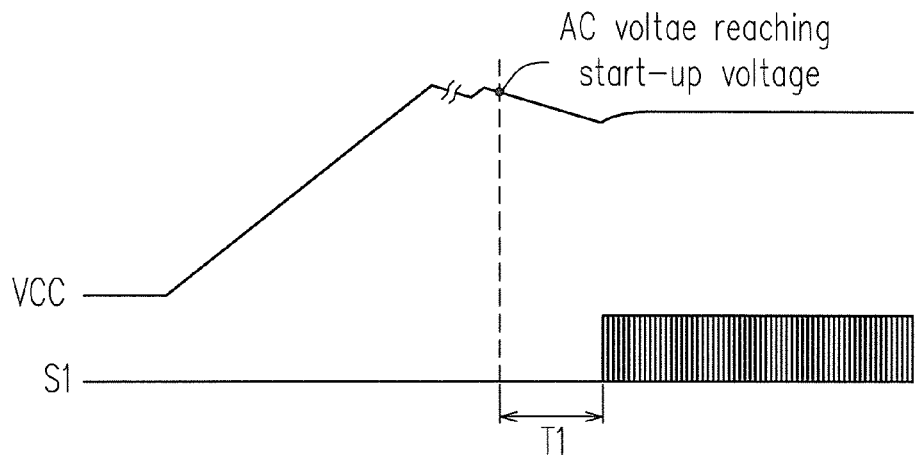
FIG. 3 is a schematic view of a waveform of a power source voltage and an enabling signal according to one embodiment of the invention.

A schematic view, as shown in FIG. 3, illustrates a waveform of the power source voltage VCC and the enabling signal S1 according to one embodiment of the invention. A detection to the AC voltage VAC1 is disabled when it is detected that the AC voltage VAC1 does not rise up to a start-up voltage of the AC/DC converting circuit 200, such that the power source voltage VCC can rise up earlier. Furthermore, since the power source voltage VCC does not drop that much, the time needed for a voltage value to rise sufficiently in order for the AC/DC power conversion controller 204 to detect the AC voltage VAC1 is shorter than the time needed when using the conventional techniques. In other words, oscillatory amplitude of the power source voltage VCC prior to an activation of the AC/DC converting circuit 200 is smaller than that of the conventional techniques. Thus, a starting time of the AC/DC converting circuit 200 can be notably shortened. Further, when the AC/DC converting circuit 202 is enabled to begin an AC/DC conversion only after the AC voltage VAC1 is continuously greater than a start-up voltage for a predetermined period of time T1, a bounce caused by switching between high and low voltage levels can be avoided in terms of affecting an accuracy of an operation of the AC/DC converting circuit 200. The AC/DC converting unit 202 is enabled to begin an AC/DC conversion after the AC/DC power conversion controller 204 is stabler.

Figure 4:
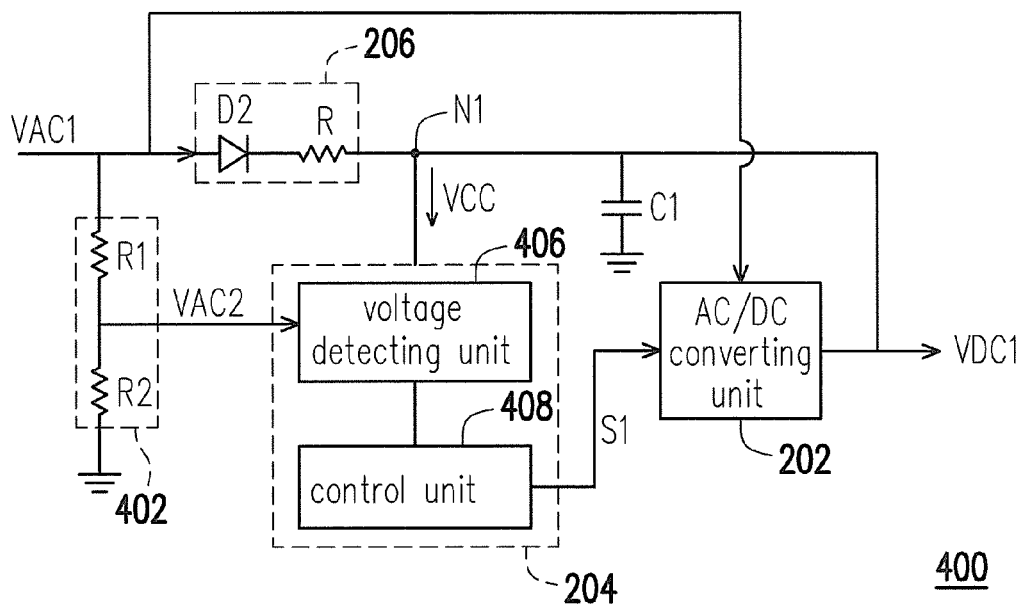
FIG. 4 is a schematic view illustrating an AC/DC converting circuit according to another embodiment of the invention.

FIG. 4 is a schematic view illustrating an AC/DC converting circuit according to another embodiment of the invention. Please refer to FIG. 4, a difference between an AC/DC converting circuit 400 in the present embodiment and the AC/DC converting circuit 200 of FIG. 2 lies in that the AC/DC converting circuit 400 further includes a capacitor C1 and a voltage dividing unit 402, wherein the capacitor C1 is coupled between a power source terminal N1 of the AC/DC power conversion controller 204 and a ground, and the voltage dividing unit 402 is coupled to the AC voltage VAC1, the AC/DC power conversion controller 204 and the ground.

Specifically, the voltage dividing unit 402 of the present embodiment is carried out by resistors R1 and R2. The resistors R1 and R2 are connected in series between the AC voltage VAC1 and the ground, and a common contact of the resistors R1 and R2 is coupled to the AC/DC power conversion controller 204.

In addition, in the present embodiment, a rectifying unit 206 includes a rectifying diode D2 and a resistor R. An anode of the rectifying diode D2 is coupled to the AC voltage VAC1, and the resistor R is coupled between a cathode of the rectifying diode D2 and the power source terminal N1 of the AC/DC power conversion controller 204. It should be noted that an implementation of the rectifying unit 206 and the voltage dividing unit 402 is simply an exemplary embodiment and the invention is not limited thereto. Other implementations may also be applied, i.e. various numbers of resistors or rectifying diodes are connected in series to carry out the rectifying unit 206 and the voltage dividing unit 402.

In addition, in the present embodiment, the AC/DC power conversion controller 204 includes a voltage detecting unit 406 and a control unit 408, wherein the voltage detecting unit 406 is coupled to the voltage dividing unit 402 and the control unit 408, and the control unit 408 is further coupled to the AC/DC converting unit 202.

A circuit operation of the AC/DC converting circuit 400 is described below with reference of FIG. 3. Please refer to FIG. 3 and FIG. 4 together. When the AC voltage VAC1 gradually rises up, the rectifying unit 206 rectifies the AC voltage VAC1 and outputs accordingly a DC power source voltage as the power source voltage VCC provided to the AC/DC power conversion controller 204. Since the voltage detecting unit 406 is still not enabled at the moment, a current needed for the AC/DC power conversion controller 204 is smaller than a current provided by the rectifying unit 206, such that the DC power current outputted by the rectifying unit 206 charges the capacitor C1 at the same time. As a result, a voltage (i.e. the power source voltage VCC) of the capacitor C1 is rising up.

When the power source voltage VCC rises up to a voltage level that is sufficient to enable the voltage detecting unit 406, the voltage detecting unit 406 begins to receive a voltage diving signal VAC2 outputted and divided by the resistors R1 and R2 to detect the AC voltage VAC1. Since a detection of the voltage detecting unit 406 consumes more currents of the AC/DC power conversion controller 204, currents provided by the rectifying unit 206 become insufficient for the AC/DC power conversion controller 204, causing the AC/DC power conversion controller 204 to withdraw electric energy stored previously from the capacitor C1 and further causing a drop down of a voltage (i.e. the power source voltage VCC) of the capacitor C1.

At this time, the control unit 408 determines whether the AC voltage VAC1 detected by the voltage detecting unit 406 is greater than or equivalent to a start-up voltage of the AC/DC converting circuit 200. If the AC voltage VAC1 is smaller than the start-up voltage, the control unit 408 shuts down the voltage detecting unit 406 for allowing currents needed for the AC/DC power conversion controller 204 recovers to currents that are smaller than those provided by the rectifying unit 206. Thus, the DC current outputted by the rectifying unit 206 charges the capacitor C1 again, and a voltage (i.e. the power source voltage VCC) of the capacitor C1 is rising up again.

Turning on and shutting down the voltage detecting unit 406 is repeated until the control unit 408 determines that the AC voltage VAC1 detected by the voltage detecting unit 406 is greater than or equivalent to a start-up voltage of the AC/DC converting circuit 200. When the control unit 408 determines that the AC voltage VAC1 is greater than or equivalent to a start-up voltage of the AC/DC converting circuit 200, the control unit 408 enables the AC/DC converting unit 202 to convert the AC voltage VAC1 into the DC voltage VDC1 after the AC voltage VAC1 is greater or equivalent to the start-up voltage for a predetermined period of time T1. Hereafter, when the DC voltage VDC1 is set up, the AC/DC converting unit 202 outputs the DC voltage VDC1 to the power source terminal N1 of the AC/DC power conversion controller 204 and charges the capacitor C1, such that the power source voltage VCC begins to rise up and is maintained in a certain value after the AC/DC converting unit 202 is enabled.

Since the control unit 408 shuts down the voltage detecting unit 406 when the control unit 408 determines that the AC voltage VAC1 is smaller than a start-up voltage of the AC/DC converting circuit 200, a period of time for a drop down and recovery of the power source voltage VCC is very short, i.e. an oscillatory amplitude of the power source voltage VCC is very small. Accordingly, when the control unit 408 determines that the AC voltage VAC1 is greater than or equivalent to a start-up voltage of the AC/DC converting circuit 200, the control unit 408 can quickly enable the AC/DC converting unit 202 to perform AC/DC conversions so as to avoid slowing speeds for turning on the AC/DC converting circuit.

It should be noted that, in some embodiments, the voltage dividing unit 402 may be coupled between the cathode of the rectifying diode D2 and the ground, i.e., the AC/DC power conversion controller may detect a rectified AC voltage generated by the rectifying diode D2 and determine whether disable a detection to the rectified AC voltage or not according comparison results of the rectified AC voltage and the start-up voltage. The embodiment of determining whether disable the detection to the rectified AC voltage or not is similar to that of determining whether disable the detection to the AC voltage or not in the above embodiments, those ordinarily skilled in the art should be able to infer from the above embodiments, thus it is omitted herein.

Figure 5:
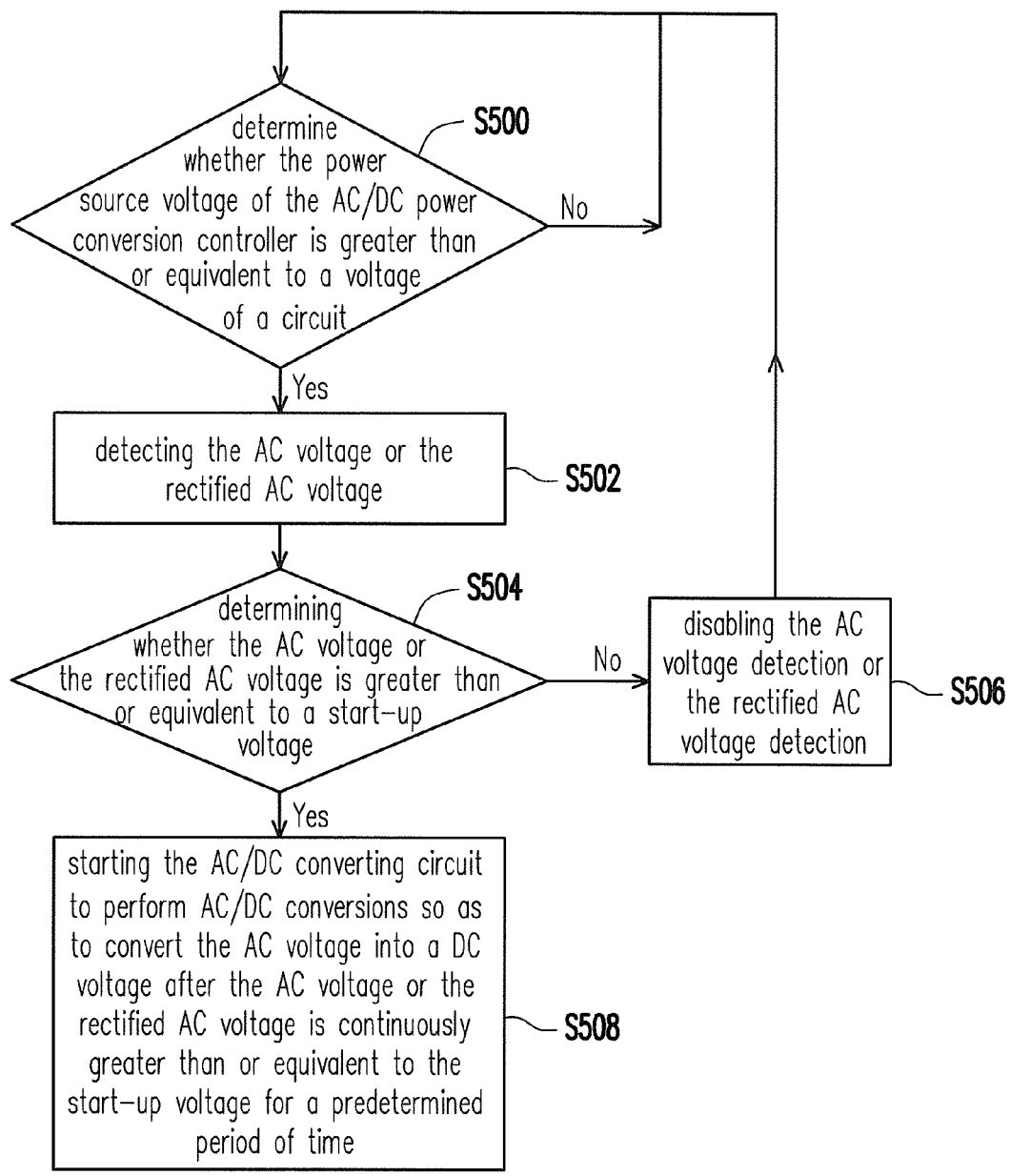
FIG. 5 is a flow chart illustrating a method for starting an AC/DC converting circuit according to one embodiment of the invention.

FIG. 5 is a flow chart illustrating a method for starting an AC/DC converting circuit according to one embodiment of the invention. Please refer to FIG. 5. In conclusion, the method for turning on an AC/DC converting circuit may include the following steps: first, detecting a power source voltage so as to determine whether the power source voltage of the AC/DC power conversion controller is greater than or equivalent to a voltage of a circuit that is started to detect an AC voltage or a rectified AC voltage (Step S500); detecting the AC voltage or the rectified AC voltage when the power source voltage is greater than or equivalent to the voltage of the circuit that is started to detect the AC voltage or the rectified AC voltage (Step S502); next, determining whether the AC voltage or the rectified AC voltage is greater than or equivalent to a start-up voltage of the AC/DC converting circuit (Step S504) and disabling the AC voltage detection or the rectified AC voltage detection if the AC voltage is smaller than the start-up voltage (Step S506) and returning back to the Step S500; on the contrary, starting the AC/DC converting circuit to perform AC/DC conversions so as to convert the AC voltage into a DC voltage if the AC voltage or the rectified AC voltage is continuously greater than or equivalent to the start-up voltage for a predetermined period of time (Step S508).

In summary, in the invention, an AC voltage detection or a rectified AC voltage detection is disabled when detecting that the AC voltage or the rectified AC voltage does not rise up to a start-up voltage, and a waiting time is no longer needed in terms of disabling the AC voltage detection or the rectified AC voltage detection only after triggering a mechanism of the under voltage lockout. Thus, a recovery time of a power source terminal voltage of the AC/DC power conversion controller is shortened to speed up a starting speed for the AC/DC converting circuit.

What is claimed is:

1. An AC/DC converting circuit, comprising:
an AC/DC converting unit for converting an AC voltage into a DC voltage; and
an AC/DC power conversion controller coupled to the AC/DC converting unit, detecting the AC voltage or a rectified AC voltage, and then disabling the AC voltage detection or the rectified AC voltage detection when detecting that the AC voltage or the rectified AC voltage does not rise up to a start-up voltage after a power source voltage of the AC/DC power conversion controller rises up to a released voltage level of a voltage lockout,
wherein after the power source voltage of the AC/DC power conversion controller rises up to the released voltage level of the voltage lockout and when the AC/DC power conversion controller detects that the AC voltage or the rectified AC voltage rises up to the start-up voltage and the AC voltage or the rectified AC voltage is continuously greater than the start-up voltage for a predetermined period of time, the AC/DC power conversion controller enables the AC/DC converting unit to convert the AC voltage into the DC voltage,
wherein an output terminal of the AC/DC converting unit is further coupled to a power source terminal of the AC/DC power conversion controller, and the AC/DC converting circuit further comprises:
a first rectifying unit coupled between the AC voltage and the power source terminal of the AC/DC power conversion controller and rectifying the AC voltage to generate the rectified AC voltage and to provide a DC power source to the power source terminal of the AC/DC power conversion controller,
wherein the AC/DC power conversion controller comprises:
a voltage detecting unit for detecting the AC voltage or the rectified AC voltage; and
a control unit coupled to the voltage detecting unit and the AC/DC converting unit to determine whether the AC voltage or the rectified AC voltage detected by the voltage detecting unit is greater than or equivalent to the start-up voltage, and shutting down the voltage detecting unit when the AC voltage or the rectified AC voltage is smaller than the start-up voltage, and enabling the AC/DC converting unit to convert the AC voltage into the DC voltage when the AC voltage or the rectified AC voltage is continuously greater than or equivalent to the start-up voltage for a predetermined period of time.

2. The AC/DC converting circuit as claimed in claim 1, further comprising:
a capacitor coupled between the power source terminal of the AC/DC power conversion controller and a ground.

3. The AC/DC converting circuit as claimed in claim 1, wherein the first rectifying unit comprises:
a rectifying diode for rectifying the AC voltage to generate the rectified AC voltage; and
a resistor connected in series with the rectifying diode between the AC voltage and the power source terminal of the AC/DC power conversion controller.

4. The AC/DC converting circuit as claimed in claim 1, further comprising:
a voltage dividing unit coupled between the AC voltage and a ground or coupled between the rectified AC voltage and the ground, dividing the AC voltage or the rectified AC voltage to provide a voltage dividing signal to the AC/DC power conversion controller.

5. The AC/DC converting circuit as claimed in claim 4, wherein the voltage dividing unit comprises:
a first voltage dividing resistor; and
a second voltage dividing resistor coupled in series with the first voltage dividing resistor between the AC voltage and the ground or between the rectified AC voltage and the ground, wherein a common contact of the first voltage dividing resistor and the second voltage dividing resistor is coupled to the AC/DC power conversion controller.

* * * * *